TRANSLATION SYSTEM

Filed May 8, 1959 3 Sheets-Sheet 1

INVENTORS.
WILLIAM E. EVANS
EARLE D. JONES
BY
Lyon & Lyon
ATTORNEYS.

Jan. 16, 1962 W. E. EVANS ET AL 3,017,625
TRANSLATION SYSTEM
Filed May 8, 1959 3 Sheets-Sheet 2

INVENTORS.
WILLIAM E. EVANS
EARLE D. JONES
BY Lyon & Lyon
ATTORNEYS.

INVENTORS.
WILLIAM E. EVANS,
EARLE D. JONES
BY Lyon & Lyon
ATTORNEYS.

United States Patent Office 3,017,625 Patented Jan. 16, 1962

3,017,625

TRANSLATION SYSTEM

William E. Evans, Los Altos Hills, and Earle D. Jones, Palo Alto, Calif., assignors to A. B. Dick Company Filed May 8, 1959, Serial No. 811,845
8 Claims. (Cl. 340—324)

This invention relates to apparatus for displaying digitally coded data in intelligible form and, more particularly, is directed to improvements in systems for displaying digitally coded data in intelligible form.

In a patent to E. A. Young et al., No. 2,784,251, there is described an arrangement for converting digital signals representative of characters to deflection voltages. These deflection voltages are applied to a monoscope tube. The monoscope tube provides as an output video signals representative of characters selected by the deflection voltages. These video signals correspond to the characters represented by the digital signals converted into the selecting deflection voltages. The video signal output of the monoscope tube is then applied to a cathode-ray tube, or similar apparatus, in order to afford a visual intelligible display of the characters. The monoscope tube used contains an aluminum target on which are printed all the characters and symbols which are to be selected by the deflection voltages. A small scanning raster is generated sufficient in size to cover one character. The raster is deflected to the desired character by the deflection signals derived from the digital signals representing the character. The video waveform derived from the monoscope target is used to intensity modulate a synchronously swept cathode-ray tube device, whereby the character is written on the face of the tube. Additional deflection potentials are used to position the character in the desired display format.

One proposed application of the above system is for use in presenting stock market data simultaneously in various broker's offices from digital data coming over the lines from the stock market exchanges. These offices are usually equipped with a television receiver for observing newsworthy telecasts. It is desirable to use such television receivers for displaying the video signal output of the monoscope tube, if possible, in order to avoid the additional expense of the display cathode-ray apparatus and deflection circuits. It is necessary, however, with systems such as are described in the said Young et al. patent, to provide some type of scan converter between the output of the monoscope tube and the television receiver, in order that the received video signals be displayed by the television receiver in view of its type of scanning raster. Such an arrangement is quite complex and expensive.

An object of the present invention is to provide, in a system of the type described, an arrangement for displaying alpha-numeric characters and symbols on a television receiver from digital signals representative thereof.

Another object of the present invention is the provision of an arrangement in a system of the type described for displaying alpha-numeric characters and symbols on a television receiver from digital information which obviates the necessity for a scan converter.

Yet another object of the present invention is the provision of a useful arrangement for displaying characters represented by digital signals on a television receiver.

These and other objects of the present invention are achieved in an arrangement wherein digital signals are applied to a plurality of separate storage means, each of which is capable of storing a line of characters in digital form. The number of the storage means accordingly is dependent on the number of lines of characters desired to be displayed in a frame. Digital data in each storage means is then extracted in the manner of the scanning raster of the television receiver and is then applied to a digital-to-analog voltage converter. In other words, storage means for each line of characters has the data read out therefrom in serial form a number of times corresponding to the number of scanning lines or horizontal lines which are allotted to displaying a line of characters on the television receiver. Then the next storage means has its data read out serially and cyclically a number of times, corresponding to the number of lines allotted for displaying on the television receiver. The frequency of readout is determined by the product of the horizontal sweep frequency of the television receiver and the number of characters to be displayed per line.

There are also generated horizontal and vertical sync signals for the television receivers at the usual horizontal and vertical sync frequencies and a horizontal and vertical sweep frequency for the monoscope tube. The horizontal sweep frequency for the monoscope tube is at a frequency determined by the product of the number of characters to be presented on a line in a television receiver times the television-receiver horizontal-sweep frequency. The vertical-sweep frequency for the monoscope tube is at a frequency which is determined by the product of the television-receiver vertical frequency and the number of lines of characters to be displayed on the television receiver.

Both the monoscope horizontal and vertical sweep frequencies, as well as the deflection signals, are applied to the monoscope tube. The monoscope tube cathode-ray beam is gated on each time a group of digital signals representative of a character are converted to deflection signals. Thus, the cathode-ray beam in the monoscope tube, in the course of the sweep of a single scanning line of the television receiver, will scan one line of each character to be displayed on the line in the television receiver. The video-output signal from the monoscope tube is combined with the generated receiver horizontal and vertical sync signals. These combined signals are then modulated on a carrier, which has the frequency of some suitable television channel which is not being used in the locality of the receiver. The modulated video carrier signals are then applied to the antenna terminals of the receiver, which can then display these signals without any further modifications.

The novel features that are considered characteristic of this invention are set forth wi h particularity in the appended claims. The invention itself, bo h as to its organization and method of operation, as well as additional objects and advantages thereof, wi l best be understood from the following description when read in connection with the accmpanying drawings, in which:

Figures 1, 4:
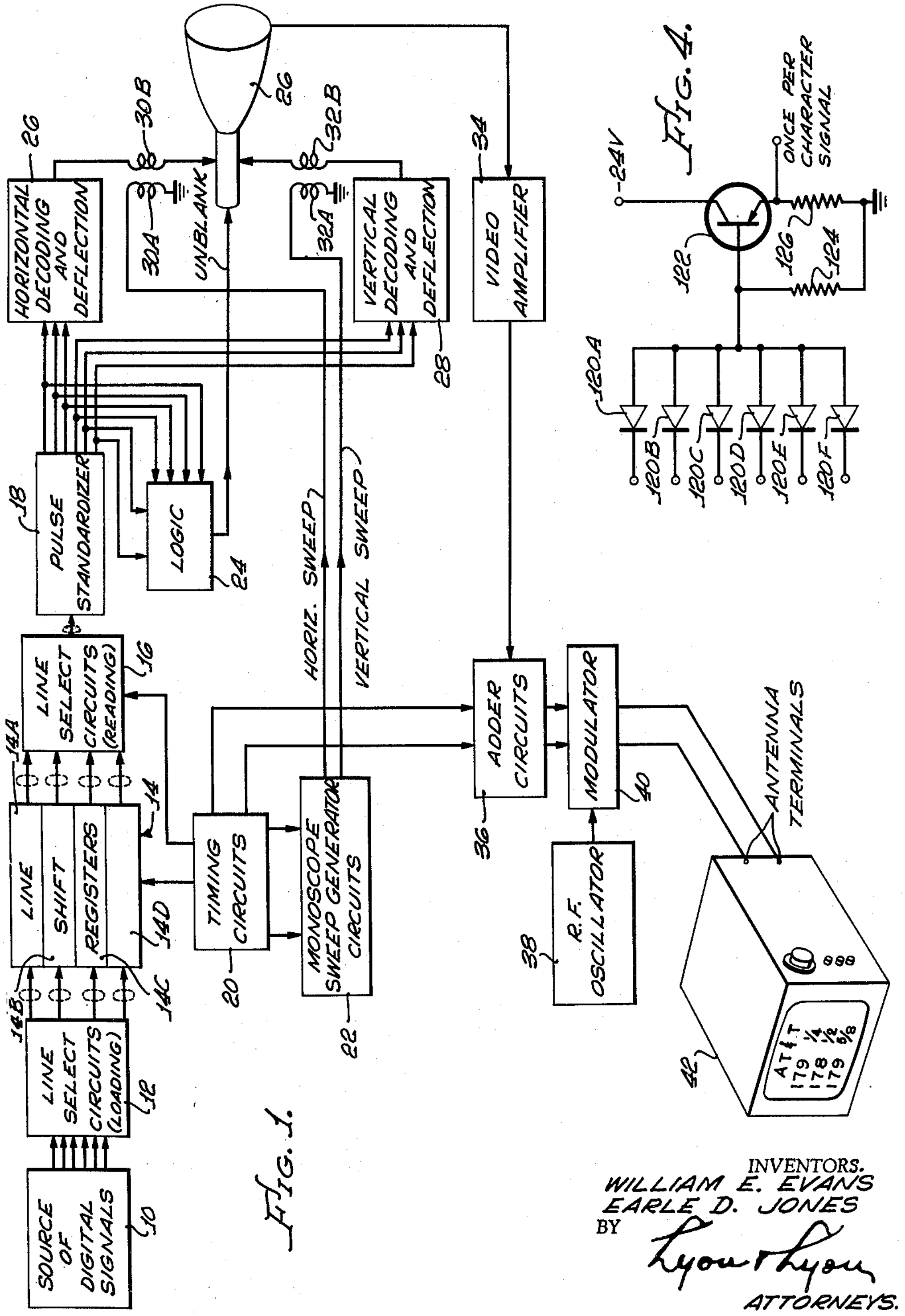
FIGURE 1 is a block diagram of an embodiment of the invention.
FIGURE 4 is a block diagram of the logic circuit employed in the embodiment of the invention.

Reference is now made to FIGURE 1, which is a block diagram of an embodiment of the invention. As previously pointed out, it is the purpose of this invention to convert digital data representa ive of alpha-numeric characters and/or symbols to a form suitable for display on a television receiver of the type found in any home. For the purposes of providing a simple explanation for this invention, but not to be construed as a limitation thereon, certain assumptions are made herein. For example, it is assumed that each character is represented by six binary bits of information. It is further assumed that the horizontal and vertical scanning frequencies of the television receiver are respectively 15,750 cycles per second and 60 cycles per second.

The source of digital signals 10 represents any suitable reservoir, such as a magnetic tape, drum, teletypewriter line, or other arrangement for providing digital signals representative of a character. These are applied to line-selection circuits 12. The line-selection circuits function to apply six-bits-per-character digital signals to line shift registers, respectively designated as 14A, 14B, 14C, and 14D. Further assumptions for the purpose of explaining this invention are that each line of characters which is going to be displayed by the television receiver contains four characters, and it is desired to display only four lines of characters on the cathode-ray tube within the television receiver.

Since it has been basically assumed that there are six bits per character which are presented to the line-selection circuits in parallel arrangement, then each one of the shift registers 14A, 14B, 14C, 14D, represented by rectangles in FIGURE 1, effectively comprises six parallel-operating shift registers for each rectangle, or a total of 24 shift registers, each group of six being operated in parallel to receive and shift six bits of data from the line-selection circuits 12. The six-bit-wide shift registers must each have capacity for one line of data storage and, with the assumptions made, each one of the rectangles 14A through 14D must therefore have capacity for storing 24 bits of data.

The shift register is a well-known commercially available piece of apparatus and may be made either of vacuum tubes, transistors, or magnetic cores. The line-select circuits 12, when a filling of the line-shift registers is necessary, will enter into each one of the six wide-shift registers in succession the digital representations of the four characters for each line to be displayed. Thus, each one of the lines connecting the line-select circuits to the line shift registers represents six lines of input data. Each one of the lines connecting the line shift registers to the line-selection circuits 12 represents six lines. Timing circuits 20 are required for providing shift pulses to the line shift registers and also for providing the necessary signals for instructing the line-selection circuit 16 to apply the digital information being received from the line shift registers to a pulse standardizer 18. The timing circuits 20 also provide vertical and horizontal sync output signals, as well as information to the monoscope sweep-generator circuits 22.

Since several scanning lines, or horizontal-deflection lines, of the receiver are required to display one line of characters, each one of the shift registers 14A through 14D cycles its contents for the number of times required to repeat the information contained for each deflection line. In accordance with the embodiment of the invention shown in FIGURE 1, each one of the line shift registers cycles its information at all times. However, selective shifting may be employed, if desired, in which case the line-select circuits 16 could be replaced by a four-input, one-output OR circuit. The function of the line-selection circuits 16 is to select the output of the line shift register required for the line of characters to be presented at the particular time by the television receiver. The function of the pulse standardizer is to equalize the amplitudes of all the binary bits in a particular character which is being received from the line-selection circuits. The pulse-standardizer circuit is the well-known amplitude-limiter circuit, and its output, consisting of six binary bits of informa ion in the form of the presence or absence of pulses, is applied to a logic circuit 24, the function of which is to unblank the cathode-ray beam of the monoscope tube 26 whenever a character on the monoscope tube target is to be scanned.

The six binary bits for each character are divided into two sets of three. Three of these bits are applied to a rectangle, designated as the horizontal decoding and deflection circuit 26. The other three of these bits are applied to a rectangle, designated as the vertical decoding and deflection circuit 28. These circuits are the well-known digital-to-analog conversion circuits which operate in response to a digital-signal input to provide a voltage output having an amplitude which represents the digital-signal input. Effectively, therefore, the outputs of the rectangles 26 and 28 may be said to be character-selection deflection voltages, since their function is to direct the cathode-ray beam of the monoscope tube to the region of its target, which has had printed thereon the character or symbol represented by the converted digital signals. These selection voltages are also combined with vertical and horizontal monoscope sweep signals, which are received from the monoscope sweep generator circuits 22. The means of such combination of signals is represented in FIGURE 1 by inductively coupled windings 30A, 30B, which add the horizontal deflection and sweep voltages, and 32A and 32B, which add the vertical deflection and sweep voltages, and apply them to the monoscope tube.

It was previously pointed out that the horizontal sweep frequency of the monoscope tube was the product of the horizontal sweep frequency of the television receiver times the number of characters to be displayed in a line of characters across the standard television-receiver tube. The vertical sweep frequency of the monoscope tube is the product of the television-receiver vertical sweep frequency times the number of lines of characters to be displayed on the face of the television-receiver tube. This sweep frequency selection, along with the operation of the line shift registers and the line-selection circuits, causes the cathode-ray beam of the monoscope tube to sweep across each one of the selected characters on the monoscope tube target once for each line of the television-receiver sweep and in the sequence of their appearance on the television receiver.

The output of the monoscope tube, consisting of the video signals representative of the characters having been scanned on the target, is applied to the video amplifier 34. The vertical and horizontal sync signals, which have been generated by the timing circuits 20, are combined with the video amplifier output in an adding circuit 36, to provide a composite video circuit. A radio-frequency oscillator 38 generates a carrier frequency which is modulated by the output of the adder circuit 36 by means of a modulator 40. The carrier frequency selected by the oscillator is one which falls within an unused channel in the particular locale in which the television receiver is being used. The output of the modulator 40 can then be applied to the antenna terminals of the television receiver 42, which when tuned to the channel selected can provide a visual display of the characters represented by the input digital signals.

Figure 2:
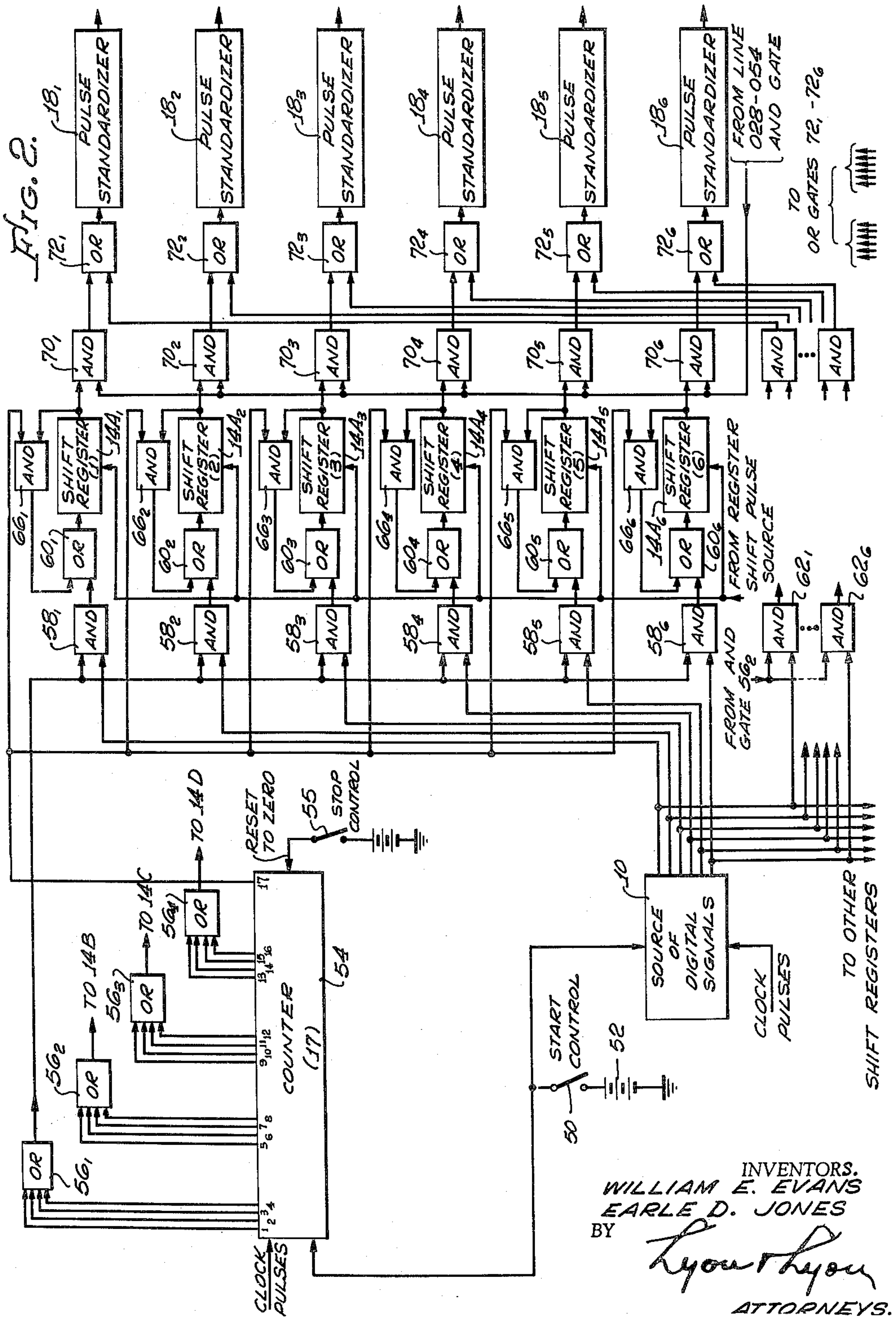
FIGURE 2 is a block diagram of an arrangement suitable for loading the shift registers used in the embodiment of the invention.

Reference is now made to FIGURE 2, which shows a block diagram from an arrangement suitable for loading the shift registers 14A through 14D, which are employed in the embodiment of the invention. The source of digital signals 10 has six separate leads which at any instant will carry the six binary bits of information representing a character. When a start switch 50 is momentarily depressed, it energizes the digital signal source 10, as well as a counter 54, from a suitable energization source, here represented by a battery 52. The counter 54 in combination with gate logic, to be described herein, performs the function allotted to the line-selecting circuit 12 in FIGURE 1. Each six-wide-shift register is selected in turn, and there is entered therein the digital data from the source 10. Since only four characters are to be displayed on each line, the six-wide-shift registers have entered into them the digital representation of four characters. Accordingly, each set of four character outputs from the counter 54 are collected by four OR gates $56_1$, $56_2$ through $56_4$. The OR gate outputs are applied to enable AND gates which are coupled to the inputs of the shift registers. Thus, the output of OR gate $56_1$ is applied to six AND gates $58_1$ through $58_6$. The output of the source of digital signals is also applied to the AND gates, and, accordingly, when they are enabled, their output in turn is applied to OR gates, respectively $60_1$ through $60_6$, the outputs of which are connected to the shift registers.

Counter 54 is advanced in response to clock pulses which may be derived from the register shift-pulse source. When the counter has advanced through its first four counts, then OR gate $56_2$ will receive an output from the next four counts 5 through 8. The output of OR gate $56_2$ is employed to enable a second set of AND gates $62_1$ through $62_6$, the outputs of which are applied to the second set of shift registers $14B_1$ through $14B_6$ (not shown).

In this manner, the counter 54, together with the AND gates and OR gates, operate in the manner described for the line-selection circuits 12 to successively load the shift registers 14A through 14D with digital data representing the characters to be displayed on the respective lines of the television receiver. The seventeenth count of counter 17, at which count it stops, is used to enable the shift registers to commence the cycling operation. To achieve this, the output of the counter, when in its seventeenth count condition, is applied to an AND gate $66_1$ through $66_6$ in association with shift registers $14A_1$ through $14A_6$, and also to correspondingly associated AND gates 66 (not shown) with the other shift registers. These AND gates 66 have their inputs connected to the output of the shift register and their outputs connected to the OR gates, respectively $60_1$ through $60_6$ of the respective shift registers $14A_1$ through $14A_6$. In this manner, as the shift register is advanced, the output is inserted into its input so that its contents can be cycled for as long as it is desired to display the information.

When the character display is no longer needed, or when it is desired to clear the display in preparation for a new set of information, the stop control, here represented by a switch 55, is momentarily depressed. This operation resets counter 54 to its zero position where it will await another loading command from start control 50. With counter 54 no longer resting on its seventeenth count position, AND gates 66 will open and all the shift registers will empty. The stop control switch may be replaced by any well-known circuitry which resets counter 54 after a predetermined display interval has occurred.

The output of each shift register $14A_1$ through $14A_6$ is applied to an AND gate associated therewith and correspondingly designated as $70_1$ through $70_6$. It will be noted that the other shift registers 14B, 14C and 14D also have similar structure to that shown in detail for a shift register 14A. These AND gates $70_1$ through $70_6$ perform the function designated by the line-selection circuits 16 in FIGURE 1. These AND gates are enabled only during the interval at which the line of characters contained in the associated shift registers are to be displayed. The manner of generating the wide pulse necessary for performing this enabling operation will be described in connection with FIGURE 3. The output from these AND gates are applied to OR gates $72_1$ through $72_6$, the outputs from which are applied to the pulse-standardizer circuits $18_1$ through $18_6$. The pulse-standardizer circuits $18_1$ through $18_6$ will be recognized as being represented by the single pulse standardizer 18. The OR gates $72_1$ through $72_6$ also collect the outputs of the AND gates, not shown, corresponding to the AND gates $70_1$ through $70_6$ for the other shift registers 14B, 14C and 14D. The output of the pulse standardizers $18_1$ through $18_6$ are applied to the logic circuits 24 and the horizontal and vertical decoding and deflection circuits 26, 28 in the manner shown in FIGURE 1.

Figure 3:
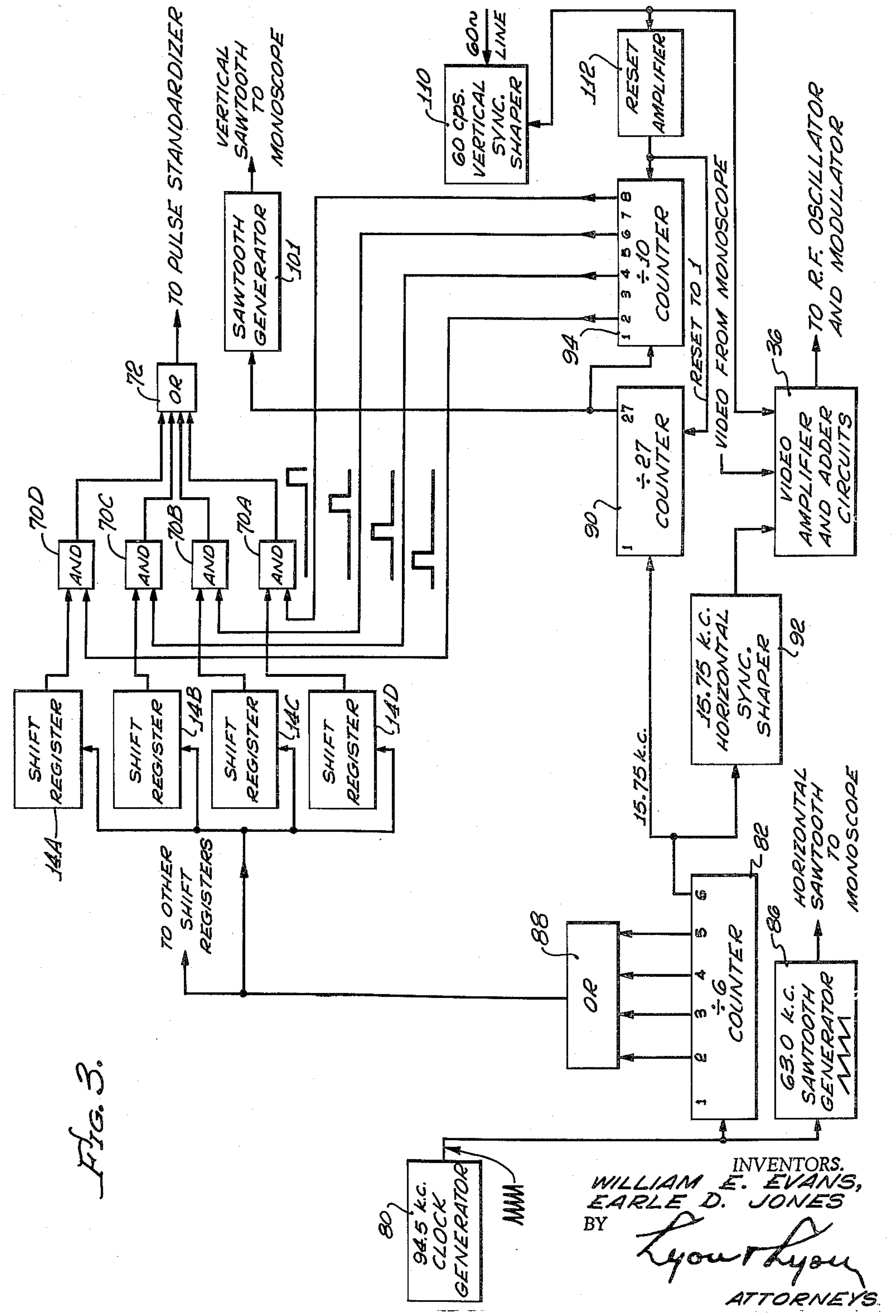
FIGURE 3 is a block diagram of the details of the timing circuits employed in the embodiment of the invention.

FIGURE 3 is a block diagram of the timing circuits employed in the embodiment of the invention. For the four-character-per-line display shown in FIGURE 1, an appropriate division of the horizontal scanning time of the television receiver would be in six equal parts, with the characters located in positions 2, 3, 4 and 5 and positions 1 and 6 reserved for the left-hand margin and for the right-hand margin plus retrace, respectively. Accordingly, the clock-pulse generator 80 generates output pulses at a rate of 94.5 kc., a rate which is equal to the product of the horizontal-sweep frequency of the television receiver (15.75 kc.) and the number of horizontal character *positions* (six) in the display. It should be noted that only four of the six character positions are actually occupied by characters in this example.

The output of the clock generator 80 is applied to a counter 82 which divides the input frequency by six. It is also applied to the input of a sawtooth generator 86, whose output is suitable for being applied to the monoscope as the one-character-wide horizontal-sweep signal which is superimposed on the horizontal character-selection signal. The second, third, fourth and fifth outputs of counter 6 are combined in an OR circuit 88, and applied to all of the shift registers for the purpose of shifting the contents thereof. The sixth output of the counter 82, which occurs at a frequency of 15.75 kc., is applied to a horizontal-sync pulse-shaping circuit 92, the output of which comprises horizontal-synchronizing signals for the television receiver. The sixth output of counter 82 is also applied to counter 90, which divides the input frequency by 27, and thus gives an output pulse at the end of each twenty-seventh horizontal scan of the television receiver. This pulse is used to initiate a sawtooth waveform in sawtooth generator 101, which waveform is just that needed to provide the one-character-high vertical monoscope-scanning signal which is superimposed on the vertical character-selection waveform. The output of counter 90 is also applied to the input of a non-circulating counter 94. This counter is of such a nature that the potential of successive output positions rises to a fixed value and remains there until the count is shifted to the next position by an input pulse. (A beam-switching-tube counter is one illustration of such a counter.)

The outputs from positions 2, 4, 6 and 8 of counter 94 comprise the wide pulses which are needed to enable AND gates 70A, 70B, 70C and 70D, each for the length of time required to recirculate the information registers twenty-seven times and to write out a full line of characters.

Counters 90 and 94 are reset to their initial positions at the time of the television vertical-synchronizing pulse by means of reset amplifier 112. The vertical-synchronizing pulse itself is derived from the 60-cycle line frequency by the vertical sync shaper 110.

FIGURE 4 is a circuit diagram of the logic circuit which is employed in the embodiment of the invention. It was pointed out that the function of the logic circuit is to detect each time a digital representation of the character was applied to the horizontal and vertical decoding and deflection circuits and to provide an output signal indicative thereof which can serve to unblank the monoscope beam, which normally is biased off. The six outputs of the pulse-standardizing circuit 18 are applied to six diodes, respectively designated as 120A through 120E. These six diodes are all connected with their anodes to the base of a transistor 122. The base of the transistor 122 is also connected through a resistor 124 to ground. The emitter of the transistor 122 is connected through a resistor 126 to ground. The collector of the transistor 122 is connected to a negative source of operating potential. Output is taken across the resistor 126 connected to the transistor emitter.

In the absence of any input signal, the transistor 122 is quiescent and provides no output by virtue of the fact that its base is at the same potential as its emitter. Should a negative pulse be applied to any one of the diodes 120A through 120E, the diode effectively couples the base of the transistor to the negative input, whereby transistor 122 can provide an output signal. The first one of the diodes 120A through 120E to conduct will cause the transistor 122 to provide an output signal so that, effectively, only one output is obtained for each character-representative signal, since the character is applied in parallel to the six diodes 120A through 120E.

As previously pointed out, the horizontal and vertical decoding and deflection circuits may be well-known digital-to-analog circuits. However, a preferred arrangement is one which is shown, described, and claimed in an application for a Deflection Circuit, by Louis J. Kabell and Earle D. Jones, filed August 4, 1958, bearing Serial No. 753,062, and assigned to a common assignee. Such circuit functions extremely reliably to provide analog selection deflection voltages in response to digital inputs.

There has accordingly been described and shown herein a novel, useful, and unique arrangement for converting digital signals representative of characters and/or symbols into deflection voltages for a monoscope tube which enables selection and scanning of characters on the target of the tube at a frequency to enable the video-signal outputs derived from the monoscope tube to be applied to the standard television receiver for presentation thereon without any modification of the television receiver being required. This arrangement avoids the necessity for scan-conversion circuits being interposed between the output of the monoscope tube and the standard television receiver.

We claim:

1. In a system of the type wherein character representative digital signals are converted to analog character selection deflection signals which are applied to a monoscope tube for producing video signals which are applied to a cathode-ray tube to be displayed, the improvement for enabling a display on a cathode-ray tube to which television raster scan type deflection signals are applied comprising for each separate line of characters to be displayed on said cathode-ray tube a separate means for storing character-representative digital signals for the associated line, means for deriving character-representative digital signals from said separate means for storing in the same sequence as said television raster-scan type deflection signals occur, means for converting said character-representative digital signals to analog character-selection deflection signals, means for generating monoscope horizontal sweep signals at a frequency equal to the product of the frequency of the horizontal sweep signals of said cathode-ray tube and the number of character positions to be displayed per line, means for generating monoscope vertical sweep signals at a frequency equal to the product of the frequency of the vertical sweep signals of said cathode-ray tube and the number of lines of characters to be displayed, means for applying said analog character selection deflection signals and said monoscope vertical and horizontal sweep signals to said monoscope tube to produce a video signal output, and means to apply the video signal output of said monoscope tube to said cathode-ray tube.

2. In a system of the type wherein character representative digital signals are converted to analog character selection signals which are applied to a monoscope tube for producing video signals which are to be displayed on a cathode-ray tube, the improvement for enabling a character display by the application of said video signals to a television receiver comprising for each separate line of characters to be displayed a separate means for storing character representative digital signals for the associated line, means for deriving character-representative digital signals from said separate means for storing in the same sequence as is desired for display by said receiver, means for converting said character-representative digital signals to analog character selection deflection signals, means for generating horizontal sync signals for said receiver, means for generating monoscope horizontal sweep signals at a frequency equal to the product of the number of character positions to be displayed on a line times the horizontal sync frequency of said television receiver, means for generating vertical sync signals for said receiver, means for generating monoscope vertical sweep signals at a frequency equal to the product of the number of lines of characters to be displayed and the vertical sync frequency of said television receiver, means for applying said analog character-selection deflection signals and said monoscope vertical and horizontal sweep signals to said monoscope tube to produce a video signal output, means for combining said video signal output with said receiver vertical and horizontal sync signals, and means for applying said combined signals to said receiver for display.

3. In a system as recited in claim 2 wherein each said separate means for storing character-representative digital signals for the associated line, comprises a shift register; said means for deriving character-representative digital signals from said separate means for storing in the same sequence as a television raster scan includes means for deriving shift pulses from said means for generating monoscope horizontal sweep signals, means for applying said shift pulses to all said shift registers, a plurality of normally closed gate means different ones of which have their inputs connected to the outputs of said shift registers and all of which have their outputs connected to said means for converting character-representative digital signals to analog character deflection signals, counter means driven from said means for generating monoscope horizontal sweep signals, means to derive from said counter means successively a single wide signal for each successive group of horizontal sweep signals, the number of horizontal sweep signals in a group being determined by the number of horizontal lines desired by displaying a line of characters, and means for separately applying said successive wide signals from said counter means to open successive ones of said normally closed gate means in a predetermined sequence desired for display of characters.

4. In a system as recited in claim 2 wherein said means for applying said combined signals to receiver for display includes a source of carrier frequency oscillations, and means for modulating said carrier frequency oscillations with said combined signals.

5. A system for obtaining a visual display of characters on a television receiver from a source of character-representative digital signals comprising for each separate line of characters to be displayed a separate means for storing character-representative digital signals for the associated line, means for filling each said means for storing from said source of character-representative digital signals, means for generating signals at a frequency equal to the product of the desired horizontal sweep frequency of said television receiver and the number of character positions per line, means responsive to said generated signals for successively deriving said character-representative digital signals from said separate means for storing in the same sequence as is desired for display by said television receiver, means for converting said character-representative digital signals to analog character selection deflection signals, means for deriving television receiver horizontal synchronizing signals from said generated signals, means for deriving television receiver vertical synchronizing signals from said generated signals, means for deriving monoscope horizontal sweep signals from said generated signals having the same frequency as said generated signals, means for deriving monoscope vertical signals from said generated signals having a frequency equal to the product of the number of lines of characters to be displayed by said television receiver and its vertical synchronizing signal frequency, monoscope tube means including means for providing video signals representative of a character responsive to analog character-selection deflection signals and monoscope sweep signals, means for applying said monoscope horizontal and vertical sweep signals and said analog character selection deflection signals to said monoscope tube, means to produce a video signal output, means for combining said video signal output with said receiver vertical and horizontal synchronizing signals, and means for applying said combined signals to said television receiver for display.

6. A system as recited in claim 5 wherein said means for applying said combined signals to said television receiver for display includes a video carrier oscillation generator, means for modulating output of said video carrier oscillation generator with the output of said means for combining, and antenna terminals on said television receiver to which the output of said means for modulating is applied.

7. A system as recited in claim 5 wherein said means responsive to said generated signals for successively deriving said character-representative digital signals from said separate means for storing in the same sequence as is desired for display by said television receiver includes a separate normally closed gate means associated with each said separate means for storing, means for applying the output of each separate means for storing to the input to its associated normally closed gate means, means coupling the outputs of all said normally closed gate means to said means for converting said character-representative digital signals to analog character-selection deflection signals, a counter driven from said generated signals, means to derive from said counter successively wide signals each having the duration of the number of horizontal lines desired for displaying a line of characters on said television receiver, and means for applying said successive wide signals from said counter to open successive ones of said normally closed gate means in a predetermined sequence desired for the sequence of display of lines of said characters.

8. A system as recited in claim 5 wherein each said means for storing character-representative digital signals for the associated line comprises a shift register; said means responsive to said generated signals for successively deriving said character-representative digital signals from said separate means for storing in the same sequence as said desired display includes means for deriving shift pulses from said generated signals, means for applying said shift pulses to all said shift registers, means for coupling all said shift register outputs to their respective inputs to cycle said shift register contents, a plurality of normally closed gates, a separate one of said gates being associated with a separate one of said shift registers and connected to receive output therefrom, means coupling the outputs of all said normally closed gates to the input of said means for converting character-representative digital signals to analog character-selection deflection signals, a counter driven by said generated signals, means to derive from said counter successively wide signals each having the duration of the number of horizontal lines desired for displaying a line of characters on said television receiver, and means for applying said successive wide signals to open said gates in a predetermined sequence for providing a desired sequence of display of the lines of said characters.

References Cited in the file of this patent

UNITED STATES PATENTS

| | | |
|---|---|---|
| 2,762,862 | Bliss | Sept. 11, 1956 |
| 2,784,251 | Young | Mar. 5, 1957 |
| 2,798,216 | Goldberg | July 2, 1957 |
| 2,840,637 | McNaney | June 24, 1958 |
| 2,902,684 | Mork | Sept. 1, 1959 |